(12) United States Patent
Hoyer et al.

(10) Patent No.: US 8,516,365 B2
(45) Date of Patent: Aug. 20, 2013

(54) DYNAMICALLY LAYING OUT IMAGES AND ASSOCIATED TEXT USING PRE-DEFINED LAYOUTS

(75) Inventors: Crystal Lynn Hoyer, Seattle, WA (US); Lawrence Waldman, Bellevue, WA (US); Jason Stuart Schneekloth, Redmond, WA (US); Thomas Charles Underhill, Seattle, WA (US); Christopher Michael Becker, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 752 days.

(21) Appl. No.: 11/763,644

(22) Filed: Jun. 15, 2007

(65) Prior Publication Data

US 2008/0313533 A1      Dec. 18, 2008

(51) Int. Cl.
*G09G 5/00*     (2006.01)

(52) U.S. Cl.
USPC .................... 715/253; 715/243; 715/249

(58) Field of Classification Search
USPC ............... 715/200, 243, 244, 247, 249, 253
See application file for complete search history.

(56) References Cited

U.S. PATENT DOCUMENTS

| | | | |
|---|---|---|---|
| 4,775,886 A | 10/1988 | Hirosawa | |
| 5,031,121 A | 7/1991 | Iwai et al. | |
| 5,339,392 A * | 8/1994 | Risberg et al. | 715/762 |
| 5,757,379 A | 5/1998 | Saito | |
| 5,860,073 A * | 1/1999 | Ferrel et al. | 715/255 |
| 5,960,229 A | 9/1999 | Fukuoka et al. | |
| 6,005,560 A * | 12/1999 | Gill et al. | 715/205 |
| 6,067,070 A | 5/2000 | Suzuki et al. | |
| 6,081,262 A * | 6/2000 | Gill et al. | 715/202 |
| 6,088,708 A | 7/2000 | Burch et al. | |
| 6,510,468 B1 * | 1/2003 | Hayne | 709/246 |

(Continued)

FOREIGN PATENT DOCUMENTS

| | | |
|---|---|---|
| JP | 2002-203012 | 7/2002 |
| JP | 2006-40132 | 2/2006 |
| WO | WO 94-19911 | 9/1994 |

OTHER PUBLICATIONS

"Meta Draw", retrieved at <<http://www.bennet-tec.com/btproducts/metadraw/metadraw.htm>>, Bennet-Tec Information Systems, Inc., 2003, pp. 1-7.

(Continued)

*Primary Examiner* — Stephen Hong
*Assistant Examiner* — Gregory J Vaughn
(74) *Attorney, Agent, or Firm* — Hope Baldauff, LLC

(57) ABSTRACT

Technologies are described herein for dynamically laying out images and associated text using pre-defined layouts. The pre-defined layouts are created and data defining the layouts is stored in a layout definition file. An application program provides a user interface for dynamically laying out the images and associated text using the contents of the layout definition file. The user interface includes a canvas onto which a user may place one or more images and a layout gallery through which a user may select a pre-defined layout to be applied to images placed on the canvas. The layout gallery includes selectable visual representations corresponding to each of the available pre-defined layouts. When one of the visual representations is selected, the corresponding pre-defined layout is dynamically applied to images on the canvas. The visual representations displayed in the layout gallery may also be utilized to generate a preview of the layout.

15 Claims, 7 Drawing Sheets

(56) References Cited

U.S. PATENT DOCUMENTS

| | | | |
|---|---|---|---|
| 6,964,025 B2 | 11/2005 | Angiulo et al. | |
| 7,039,863 B1 | 5/2006 | Caro et al. | |
| 7,039,875 B2* | 5/2006 | Khalfay et al. | 715/762 |
| 7,380,212 B2* | 5/2008 | Cody et al. | 715/752 |
| 7,522,176 B2* | 4/2009 | Tolle et al. | 345/619 |
| 2002/0063734 A1* | 5/2002 | Khalfay et al. | 345/744 |
| 2003/0051022 A1* | 3/2003 | Sogabe et al. | 709/223 |
| 2003/0055871 A1 | 3/2003 | Roses | |
| 2003/0058286 A1* | 3/2003 | Dando | 345/853 |
| 2003/0184585 A1 | 10/2003 | Lin et al. | |
| 2004/0183830 A1* | 9/2004 | Cody et al. | 345/752 |
| 2005/0012962 A1 | 1/2005 | Kido | |
| 2005/0055636 A1 | 3/2005 | Graves | |
| 2005/0154980 A1 | 7/2005 | Purvis et al. | |
| 2005/0210052 A1* | 9/2005 | Aldridge | 707/101 |
| 2005/0229157 A1 | 10/2005 | Johnson | |
| 2006/0053370 A1 | 3/2006 | Hitaka et al. | |
| 2006/0066631 A1 | 3/2006 | Schorr et al. | |
| 2006/0070005 A1* | 3/2006 | Gilbert et al. | 715/763 |
| 2006/0200758 A1 | 9/2006 | Atkins | |
| 2006/0209093 A1 | 9/2006 | Berker et al. | |
| 2006/0212801 A1 | 9/2006 | Berker et al. | |
| 2006/0265649 A1 | 11/2006 | Danilo | |
| 2007/0028165 A1 | 2/2007 | Cole | |
| 2007/0044014 A1 | 2/2007 | Hanechak | |
| 2009/0287996 A1 | 11/2009 | Norimatsu et al. | |

OTHER PUBLICATIONS

Farris, "SmartDraw FotoFinish Suite", retrieved at <<http://www.gtpcc.org/gtpcc/fotofinish.htm>>, Golden Triangle PC Club, Jun. 2004, pp. 1-11.

Good, et al.,, "Create Interactive Image Portfolios That Can Be Embedded on Any Web Page: Leafletter" retrieved at <<http://www.masternewmedia.org/news/2007/01/15/create_interactive_image_portfolios_that.htm>>, Jan. 15, 2007, pp. 1-16.

International Search Report dated Oct. 24, 2008 in International Application No. PCT/US2008/065464.

"PhotoPlus X3 User Guide", www.Serif.com, Retrieved Jan. 13, 2010 from http://www.serif.com/community/pdfs/PhotoPlusx3-uk.pdf, 224 pages.

Chinese Official Action dated Mar. 24, 2011 in Chinese Application No. 200880020169.6.

Tuchiya, Noriko, "You can easily carry out picture synthesis which was difficult by using an eraser tool! Permanent Edition, Changing a failed picture into success! It is also easy to perform clipping processing, a book which makes it enjoyable to use a digital camera with image editing software" Photoshop Elements, ASCII Corporation, Japan, Sep. 1, 2005, pp. 32-35.

Japanese Official Action dated Nov. 16, 2012 in Japanese Application No. 2010-512263.

U.S. Official Action dated Mar. 25, 2013 in U.S. Appl. No. 12/722,541.

Japanese Official Action dated Mar. 15, 2013 in Japanese Application No. 2010-512263 Translation.

Yuichiro Masui, "Ajax, Usability Revolution by JavaScript, Time-tested Advanced-Technology Frequently Used by Google, as well, Chapter 5 Ajax Tips! Convenient Library, Bookmark-Compliant, GreaseMonkey . . .," WEB+DB PRESS, vol. 27, First Ed., Gijutsu-Hyohron Co., Ltd., Japan, Aug. 1, 2005, pp. 137-140.

"Best PC Life Led by the Strongest Combination! Impressive Software and Impressive Settings, SETUP*PLAY, '2 Channel & mixi, Under Cover Strategy Guide for Information War within Communities, " Windows 100%, vol. 10, No. 5, Shinyusha. Co., Ltd., Japan, May 1, 2007, p. 42.

"Online Sftware Topics, Pictographs Can Be Sent from PC to Cell Phone 'Emochi!" Windows 100%, vol. 8, No. 7, Shinyusha. Co., Ltd., Japan, Jul. 1, 2005, p. 7.

* cited by examiner

DYNAMICALLY LAYING OUT IMAGES AND ASSOCIATED TEXT USING PRE-DEFINED LAYOUTS

BACKGROUND

Many types of desktop applications allow users to add images and associated text annotations to their documents. For instance, many word processing applications, spreadsheet applications, and presentation applications allow a user to insert one or more images into a document and to place text annotations in relation to the images. These applications, however, generally provide little or no design guidance on how the images and the associated text annotations should be laid out in relation to one another. Instead, most applications require users to manually lay out the images and the associated text annotations.

While a manual approach to laying out images and associated text annotations does provide great flexibility for highly skilled designers, most users do not possess the creative design skills necessary to create a professional-looking layout of images and associated text. As a result, many users end up creating layouts with images and associated text that look amateurish, include misaligned or inappropriately sized images, and possibly text annotations that are inappropriately located or sized for the layout of the related images. In many cases, manually generated layouts simply do not communicate the message desired by the user.

Some desktop applications do provide limited functionality for assisting a user in laying out multiple images on a page automatically using static templates. These types of applications do not, however, dynamically lay out images and do not provide any guidance for laying out text annotations that are associated with the images. Moreover, these types of applications generally force users to utilize the exact structure and design of the provided templates. Users may not be permitted to modify the layout provided by the templates through the rearrangement or addition of images or related text. This can be frustrating for a user attempting to create a layout that includes text annotations or more or fewer images than permitted by the template.

It is with respect to these considerations and others that the disclosure made herein is presented.

SUMMARY

Technologies are described herein for dynamically arranging images and related text annotations. Through the utilization of the technologies and concepts presented herein, an application program can dynamically lay out images and associated text annotations using pre-defined layouts. Different layouts can be applied to images and their associated text annotations and the pre-defined layouts can be changed until the best possible layout is identified. Moreover, the pre-defined layouts permit additional images or annotations to be added while still retaining the design elements of the layout. Through the use of these technologies, a user with virtually no creative design skills can create a professional-looking layout of images and associated text annotations.

According to one aspect presented herein, one or more pre-defined layouts are created and data defining the layouts is stored in a layout definition file. Each pre-defined layout specifies a layout for one or more images and associated text annotations. In particular, each pre-defined layout specifies how the images and any associated text annotations should be sized and positioned in relation to one another. For instance, a layout may specify the location and size of the images in the layout along with the location, size, and style of text associated with the images. The layout may also specify how the layout should be modified if additional images or text are added to the layout. As will be described in detail below, the contents of the layout definition file are utilized to dynamically lay out images and associated text, and to regenerate the layout following the addition of new content or the modification of the layout.

According to another aspect, an application program is described herein that is operative to utilize the contents of the layout definition file to dynamically lay out images and associated text. In one implementation, the application program provides a user interface for dynamically laying out the images and associated text. The user interface includes a canvas onto which a user may place one or more images. The user interface also includes a control through which a user may select a pre-defined layout to be applied to images placed on the canvas. In one implementation, the control is a layout gallery that is displayed adjacent to the canvas. The layout gallery includes selectable visual representations corresponding to each of the available pre-defined layouts. When one of the visual representations is selected, the corresponding pre-defined layout is dynamically applied to images on the canvas.

Once the layout has been dynamically generated and displayed, a user may modify the layout by adding additional images or completing the text annotations in the layout. The user may also modify the size or position of elements in the layout. In response to modification of the layout, the contents of the layout definition file are utilized to regenerate the layout in view of the modification. For instance, if a new image is added, the layout may be regenerated to appropriately incorporate the new image into the layout. Other pre-defined layouts may also be applied to the images and text through the selection of the visual representations in the layout gallery.

According to another aspect, the visual representations displayed in the layout gallery may be utilized to generate a preview of the layout. For instance, in one implementation, a live preview is generated of the corresponding pre-defined layout when a user interface mouse cursor is hovered over a visual representation in the layout gallery. Hovering refers to the process of placing a user input mouse cursor over an object without selecting the object using a mouse button. It should be appreciated that other user input mechanisms utilizing other types of user input devices other than a mouse may be utilized to cause a preview of the layout to be generated. By generating a preview in this manner, a user can view the results of the application of the pre-defined layout to images on the canvas before applying the pre-defined layout. When a suitable layout has been identified, the pre-defined layout can be applied through the selection of the appropriate visual representation.

It should be appreciated that the implementations described herein are applicable to any type of computer program that lays out images and associated text. For example, the concepts presented herein may be utilized in word processing application programs, spreadsheet application programs, presentation application programs, desktop publishing application programs, and other types of application programs. The above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
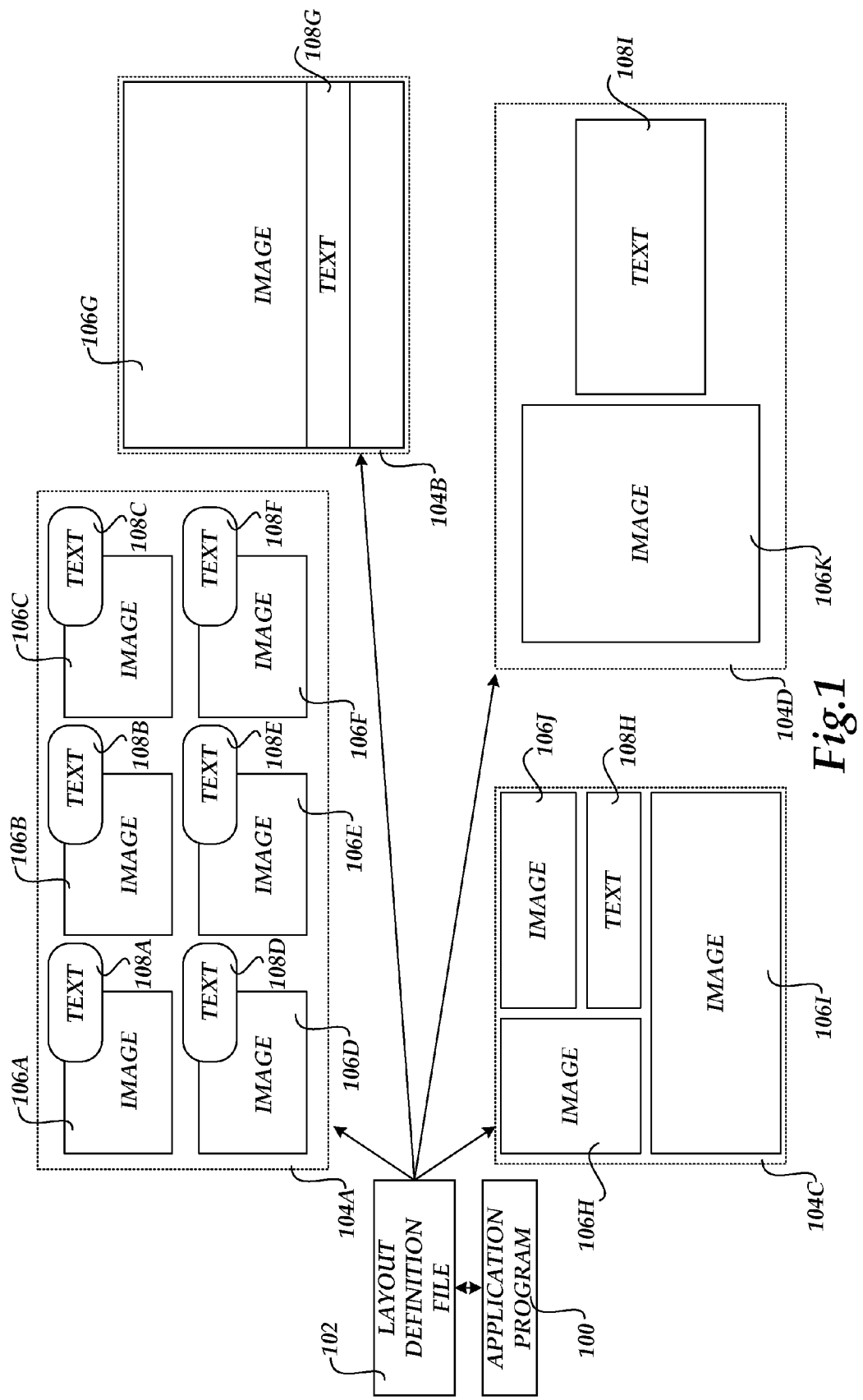
FIG. 1 graphically illustrates the contents of a layout definition file and several pre-defined layouts defined therein that are presented in one implementation.

The following detailed description is directed to technologies for dynamically arranging images and associated text using pre-defined layouts. Through the use of the embodiments presented herein, an application program can provide an automated, dynamic arrangement of images and associated text using pre-defined layouts. Utilizing an application program that embodies the concepts and technologies presented herein, a user can easily generate a professional-looking layout of images and associated text annotations.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for laying out images and associated text will be described.

Turning now to FIG. 1, details will be provided regarding one embodiment presented herein for dynamically arranging images and text that is associated with the images using pre-defined layouts. In particular, FIG. 1 illustrates aspects of an application program 100 and a layout definition file 102. The application program 100 utilizes the contents of the layout definition file 102 when dynamically laying out images and text. It should be appreciated that the application program 100 may be any type of application program that lays out images and associated text including, but not limited to, a word processing application program, a spreadsheet application program, a presentation creation application program, a web page design program, or a desktop publishing applications program. The concepts presented herein are not limited to use with application programs for performing any particular function.

According to one implementation, the layout definition file 102 stores data that defines one or more layouts 104A-104D. The layouts 104A-104D each define the placement, size, and other characteristics for one or more images and for text associated with the images. For instance, the layout 104A includes six images 106A-106D and text 108A-108D associated with the images. The layout 104B includes one image 106G and text 108G oriented horizontally across the image 106G. The layout 104C includes three images 106H-106J and text 108H placed between the images. The layout 104D includes one image 106K and text 108I. It should be appreciated that the layouts 104A-104D shown in FIG. 1 are merely illustrative and that the layout definition file 102 may define any number of layouts with any arrangement of images and/or associated text.

According to other aspects presented herein, the layout definition file 102 also stores data for use by the application program 100 in dynamically laying out the images and text within each layout. This data also allows the application program 100 to dynamically regenerate a layout following a modification to a layout, such as the rearrangement of the images or text in the layout or the addition of a new image or text to the layout. In one implementation, this data is stored as constraints and rules for dynamically generating each layout. The application program 100 utilizes the constraints and rules to lay out each of the images and text in a layout and to regenerate the layout following a modification.

Constraints define how a content object should be laid out by an application program. A content object may be an image, movie, text, or other type of digital media. The constraints may include data defining the position and size of each content object. The size and position of each object may be defined in relation to other objects or independently from other objects. The constraints also define how each content object should be formatted. For instance, the constraints for a text object may define the font face, font size, alignment, justification, and other formatting characteristics for the text. Constraints may include numeric values or Boolean values. Numeric constraints can specify a specific numeric value (e.g., width=1 inch). Numeric constraints may also define their value by referring to other constraints using references (e.g., height=width*0.75).

The application program 100 utilizes the rules defined in the layout definition file 102 to modify the constraints. In particular, the rules define how to modify one or more constraints to attempt to fit content within a layout. For instance, the application program 100 utilizes the rules to modify the constraints when application of the constraints to a content object results in the content overflowing specified boundaries for the content object. As an example, if an image is added to a layout that is too large for the layout, the image may be dynamically scaled, cropped, stretched, or otherwise resized to fit the layout. These operations may be performed in a non-destructive manner to preserve the contents of the image. In embodiments, some operations may be performed in a destructive manner. As another example, a constraint may specify that the font size for a text object is 14 points. In turn, the rules may specify that the font size may be reduced down to 8 points in an attempt to fit the text to the layout. It should be appreciated that rules and constraints may be propagated between different objects to ensure consistency in the layout. In this manner, for instance, all text or images in a layout may be made the same size. The application program 100 will dynamically adjust the size of the text or images depending upon the amount of text or number of images present in the layout.

According to other implementations, the layout definition file 102 may also specify a layout algorithm to be utilized by the application program 100 for laying out content. For instance, the layout definition file 102 may specify an algorithm for laying out text that is utilized by the application 100 to arrange the text within a layout. Other types of layout algorithms for other types of content objects may also be specified within the layout definition file 102. A user may also be permitted to add new layouts to the layout definition file 102.

According to one implementation, the contents of the layout definition file 102 are specified using the extensible markup language ("XML"). XML is a standard format for communicating data. In the XML data format, a schema is utilized to provide XML data with a set of grammatical and data type rules governing the types and structure of data that may be communicated. The XML data format is well known to those in the art and, therefore, not discussed in further detail herein. Additional details regarding the contents of the layout definition file 102 and the process utilized by the application program 100 for dynamically laying out images and text can be found in U.S. Patent Pub. No. US2006/0209093, filed on Mar. 15, 2005, and entitled "Method and Computer-Readable Medium for Generating Graphics Having a Finite Number of Dynamically Sized and Positioned Shapes," U.S. Patent Pub. No. US006/0212801, filed on Mar. 15, 2006, and entitled "Method and Computer-Readable Medium for Fitting Text to Shapes Within a Graphic," and U.S. Patent Pub. No. US 2006/0066631, filed on Sep. 30, 2004, and entitled "Method, System, and Computer-Readable Medium for Creating and Laying Out a Graphic Within an Application Program," each of which is expressly incorporated herein by reference in its entirety.

Figure 2:
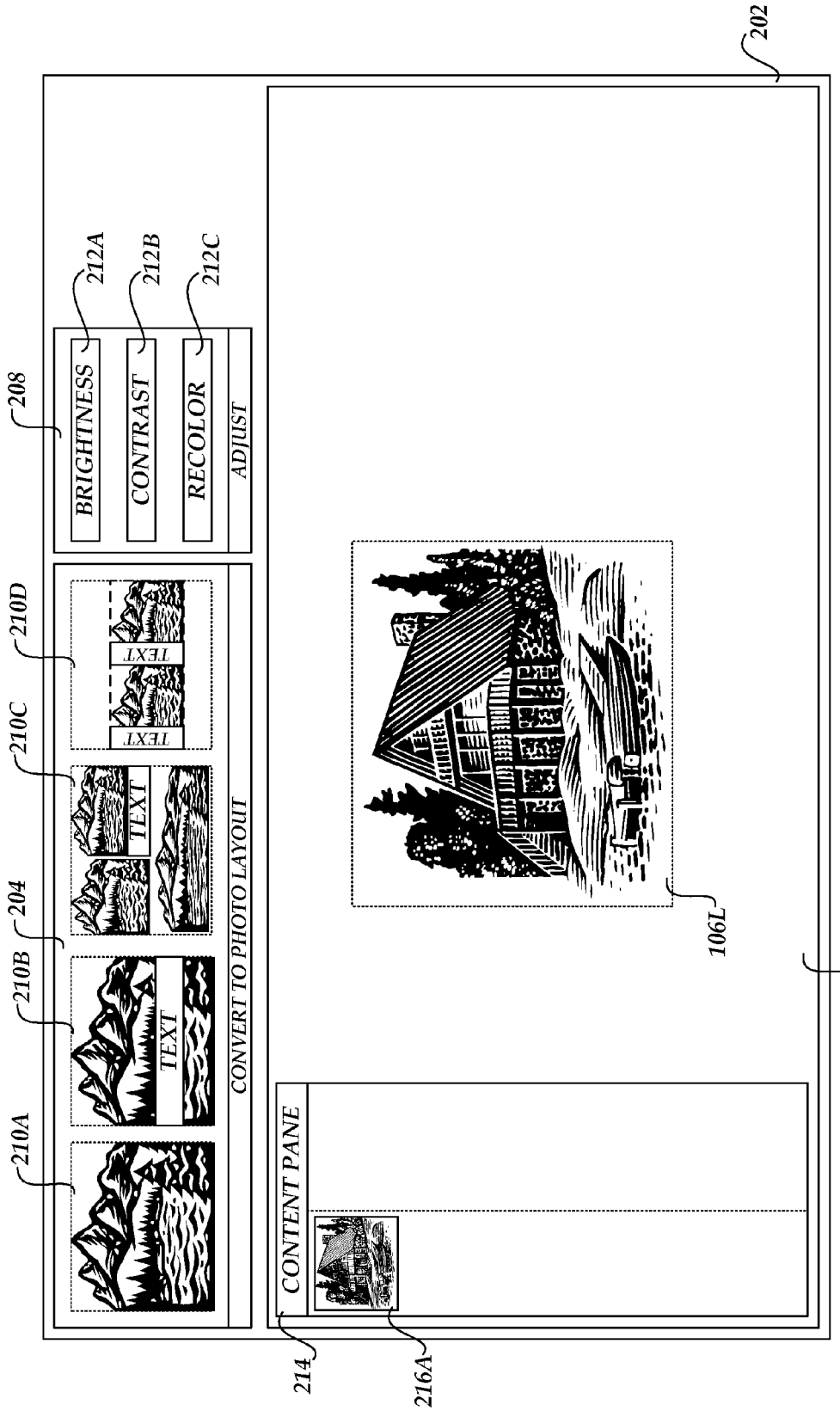
FIGS. 2-5 are screen diagrams showing aspects of a user interface provided by an application program capable of dynamically laying out images and associated text using pre-defined layouts in one embodiment presented herein.

Referring now to FIG. 2, an illustrative user interface 202 provided by the application 100 in one embodiment for dynamically laying out images and associated text will be described. As shown in FIG. 2, the user interface 202 includes a canvas 206. The canvas 206 is utilized to hold the images and text for a layout. A user may place images on the canvas 206 through an appropriate operation, such as an insert operation or a "cut and paste" operation. For instance, in the example shown in FIG. 2, a user has placed the image 106L on the canvas 206. It should be appreciated that the canvas 206 may take different forms dependent on the nature of the application program 100. For instance, if the application 100 is a presentation application program, the canvas 206 may be a single slide within a slide presentation. If the application program 100 is a word processing application program 100, the canvas 206 may comprise a page within a word processing document. If the application program 100 is a spreadsheet application program, the canvas 206 may comprise a portion of a spreadsheet. The canvas 206 may take other forms when implemented by other types of application programs.

The user interface 202 shown in FIG. 2 also includes a layout gallery 204. The layout gallery 204 includes selectable visual representations 210A-210D of the pre-defined layouts that may be dynamically applied to images placed on the canvas 206. Each of the visual representations 210A-210D corresponds to a layout. When a visual representation is selected, such as by using a mouse button or other type of user input device, the corresponding layout will be applied to the images and text that have been placed on the canvas 206. For instance, the visual representation 210A corresponds to a layout having a single image and no text. The visual representation 210B corresponds to a layout having a single image and text laid out horizontally across the image. The visual representation 210C corresponds to a layout having three images with text placed between the three images. The visual representation 210D corresponds to a layout having two images with text vertically placed across both of the images.

According to implementations, the user interface 202 may also include an image adjustment palette 208. The image adjustment palette 208 provides user interface controls 212A-212C for adjusting images placed on the canvas 206. For instance, the user interface control 212A provides functionality when selected for adjusting the brightness of an image, the user interface control 212B provides functionality for adjusting the contrast of an image, and the user interface control 212C provides functionality for adjusting the color of an image. Other tools may be provided in a similar manner for adjusting the contents of an image.

According to other implementations, the user interface 202 also includes a content pane 214. The content pane 214 provides a visual representation of the data model set forth on the canvas 206. In particular, in one embodiment, the content pane 214 includes a thumbnail image for each image on the canvas 206. For instance, in the example illustrated in FIG. 2, the content pane 214 includes a thumbnail 216A corresponding to the image 106L. The thumbnail images may reflect modifications made to the corresponding image, such as the application of a style to an image. The content pane 214 also includes the text associated with each image on the canvas.

According to implementations, the content pane 214 may be utilized to select and edit images and text present on the canvas 206. For instance, in one implementation, selection of a thumbnail image in the content pane will cause the corresponding image on the canvas to also be selected. Text shown in the content pane 214 may also be selected and edited. Such edits are reflected in the text shown on the canvas 206. The content pane 214 may also be utilized to add additional nodes to the data model, to remove nodes from the data model, to change the order of the nodes, and to perform other editing functions.

Figure 3:
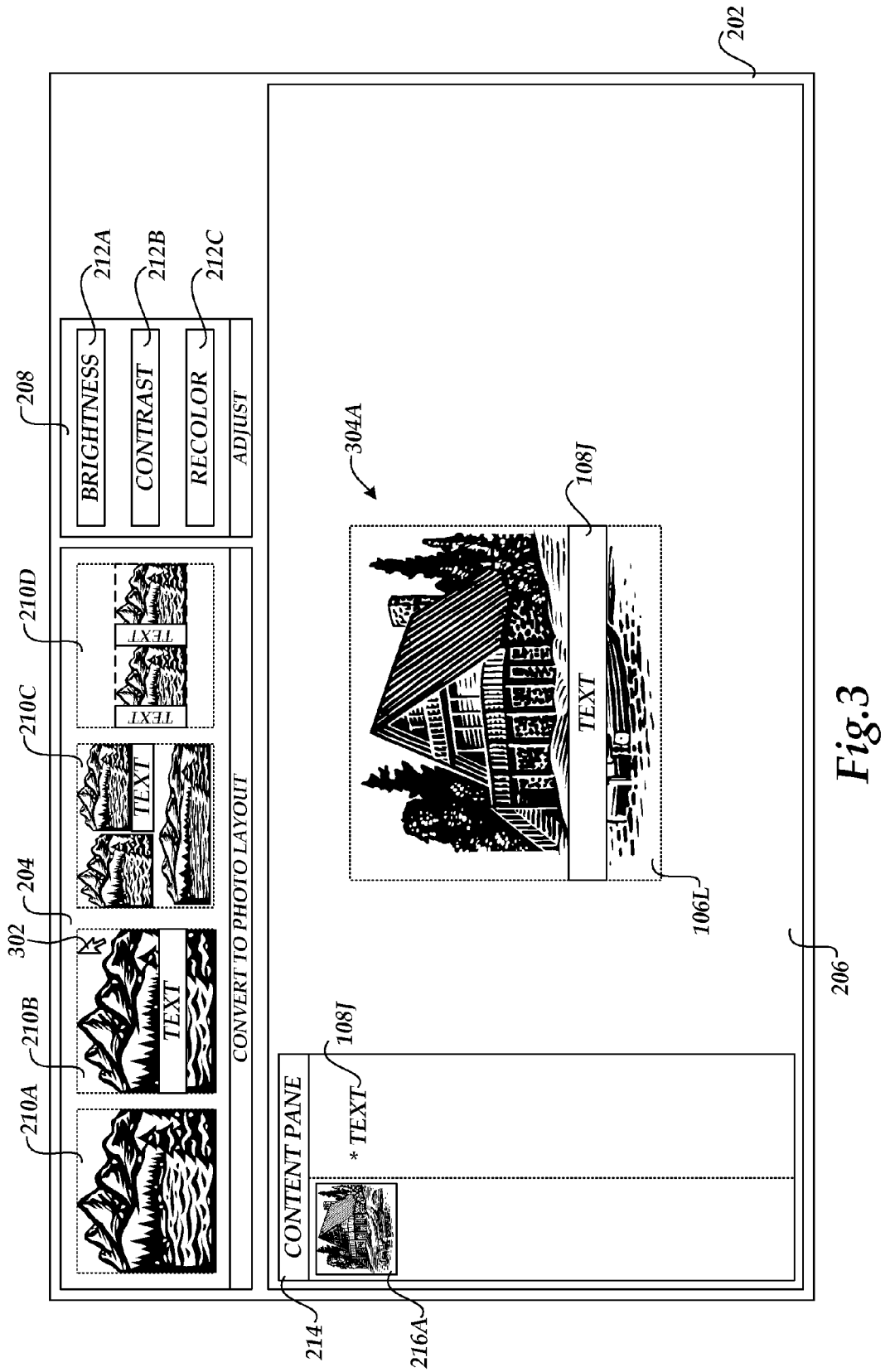

Turning now to FIG. 3, additional details will be provided regarding aspects of the user interface 202 in one embodiment presented herein. In this embodiment, the user interface 202 is operative to provide a live preview of a selected layout in response to user commands. In particular, in this embodiment, a user may utilize a mouse input device to hover a mouse cursor 302 over one of the visual representations 210A-210D. In response to detecting such input, the application program 100 is operative to dynamically lay out the images present on the canvas 206 according to the corresponding pre-defined layout. The generated layout is displayed as a preview. That is, the generated layout is not actually applied to the images on the canvas 206. Rather, the layout is only temporarily displayed to the user. In this manner, a user may hover the mouse cursor 302 over each of the visual representations 210A-210D to obtain a preview of how the corresponding layout will appear when applied to the contents of the canvas 206. It should be appreciated that other types of user input using other user input devices may be utilized to cause the preview to be generated.

In the example shown in FIG. 3, the mouse cursor 302 is hovering over the visual representation 210B. As a result, the application program 100 has generated and displayed a preview of a layout 304A using the single image 106L present on the canvas. The layout 304A includes the text 108J, which has been reflected on the canvas 206 and in the content pane 214. It should be appreciated that the layout 304A has not actually been applied to the contents of the canvas 206. As a result, when the mouse cursor 302 is moved away from the visual representation 210B, the canvas 206 would again appear as it does in FIG. 1. It should also be appreciated that a mouse hover event is but one mechanism for indicating to the application program 100 that a live preview of a layout should be generated and displayed. Other types of user input mechanisms may also be utilized in a similar fashion. As will be described in greater detail below with respect to FIG. 5, selection of one of the visual representations 210A-210D, such as through the use of a mouse button, will cause the layout corresponding to the selected visual representation to be dynamically applied to the contents of the canvas 206.

Figure 4:
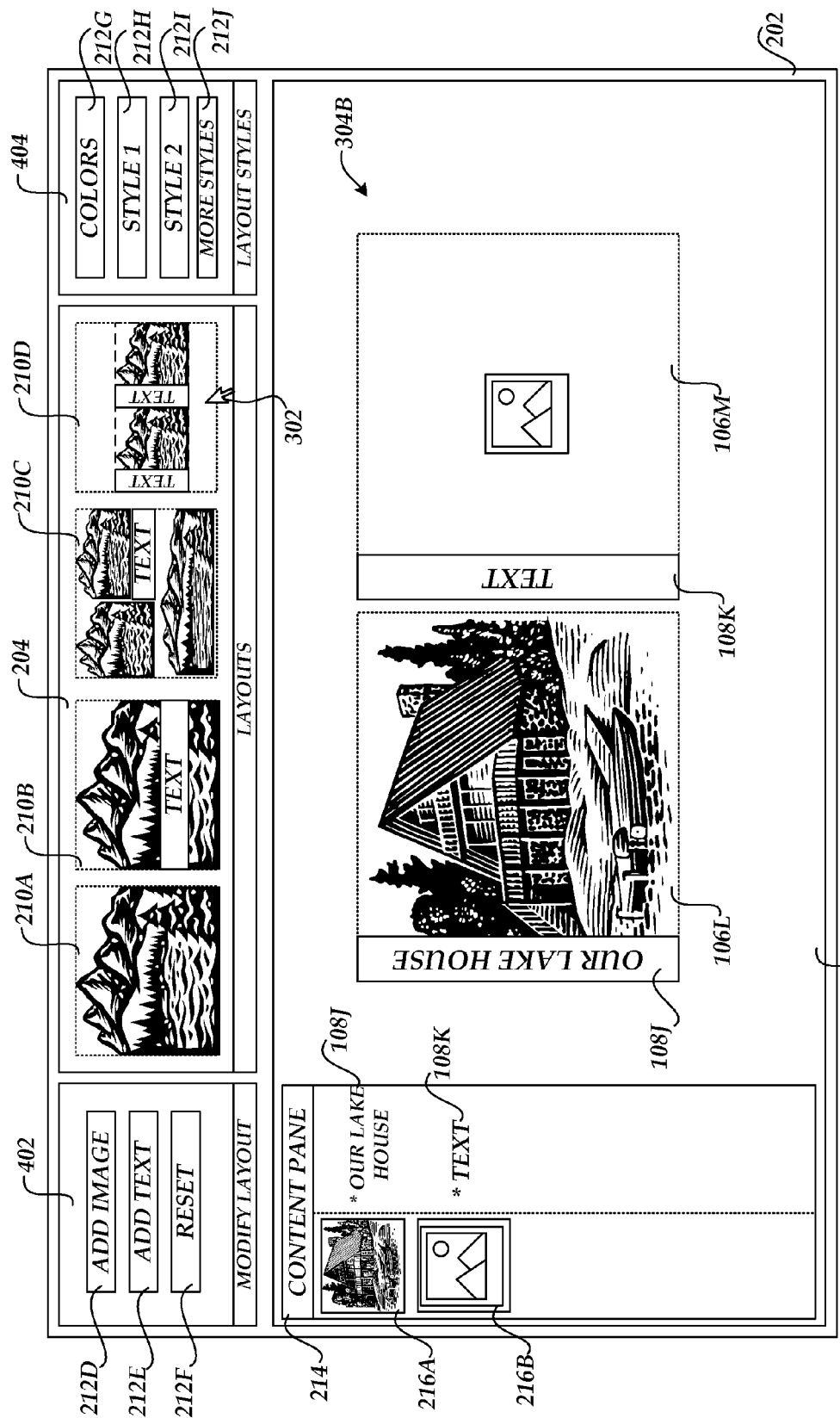

Referring now to FIG. 4, additional details regarding the operation of the user interface 202 provided in one embodiment will be described. In the example shown in FIG. 4, a user has utilized the mouse cursor 302 and a mouse button to select the visual representation 210D. As a result, the layout corresponding to the visual representation 210D has been dynamically applied to the contents of the canvas 206 shown in FIG. 1. This has resulted in the layout 304B shown on the canvas 206 in FIG. 3.

As shown in FIG. 3, the layout 304B includes the image 106L and the text 108J. In this example, the user has replaced the placeholder text with the phrase "Our Lake House." Because only one image was present on the canvas 206 when the visual representation 201D was selected, a placeholder has been placed on the canvas for the image 106M. A user may insert an image in place on the canvas 206 to replace the placeholder. The user may also modify the text 108K by selecting the text 108K and typing new text. The typed text will replace the text 108K. It should be appreciated that, according to embodiments, the text annotations may comprise captions or be dynamically tied to references.

As will be described in greater detail below, a user may also select any of the visual representations 210A-210D at any time to cause the corresponding layout to be applied to the contents of the canvas. When a user selects a new visual representation, the images in the current layout are carried forward to the new layout corresponding to the selected visual representation. In this manner, a user can quickly move between layouts without having to reselect the images to be utilized in the layout.

In response to the application of a layout to the contents of the canvas, the user interface 202 has also presented a style palette 404 and a layout modification palette 402. The style palette 404 includes user interface objects 212G-212J for adjusting a style applied to the images and text on in the layout 304B. For instance, the user interface object 212G may be selected to modify the colors in the layout 304B, such as the colors of text or an image background. The user interface objects 212H-212I may be selected to apply a different style to the layout 304B. The user interface object 212J may be selected to gain access to additional styles not shown in the style palette 404. It should be appreciate that other functionality not described herein for modifying images may also be provided.

The layout modification palette 402 provides functionality for modifying a layout. For instance, the user interface object 212D provides functionality when selected that allows a user to add another image to a layout. The user interface object 202E provides functionality when selected that allows a user to add additional text to a layout. The user interface object 212F provide functionality when selected that resets a layout by removing any user-made modifications to the layout. When a modification has been made to a layout, such as the addition of new images or text, the application program 100 dynamically regenerates the layout using the contents of the layout definition file 102 in the manner described above with reference to FIG. 1. Functionality may also be provided for modifying the order that images are displayed within a layout. For instance, in one implementation, a user may be able to select and drag images to change the ordering of images with respect to one another within a layout.

As also shown in FIG. 4, the content pane 214 has been updated to reflect the application of the selected layout to the canvas. In particular, the text 108J has been displayed adjacent to the image thumbnail 216A. The image thumbnail 216B corresponding to the image 106M has also been displayed along with the corresponding text 108K. As discussed above, the image thumbnails 216A-216B may be utilized to select the corresponding images 106L-106M, respectively. The content pane 214 may also be utilized to perform the other text editing operations described above.

Figure 5:
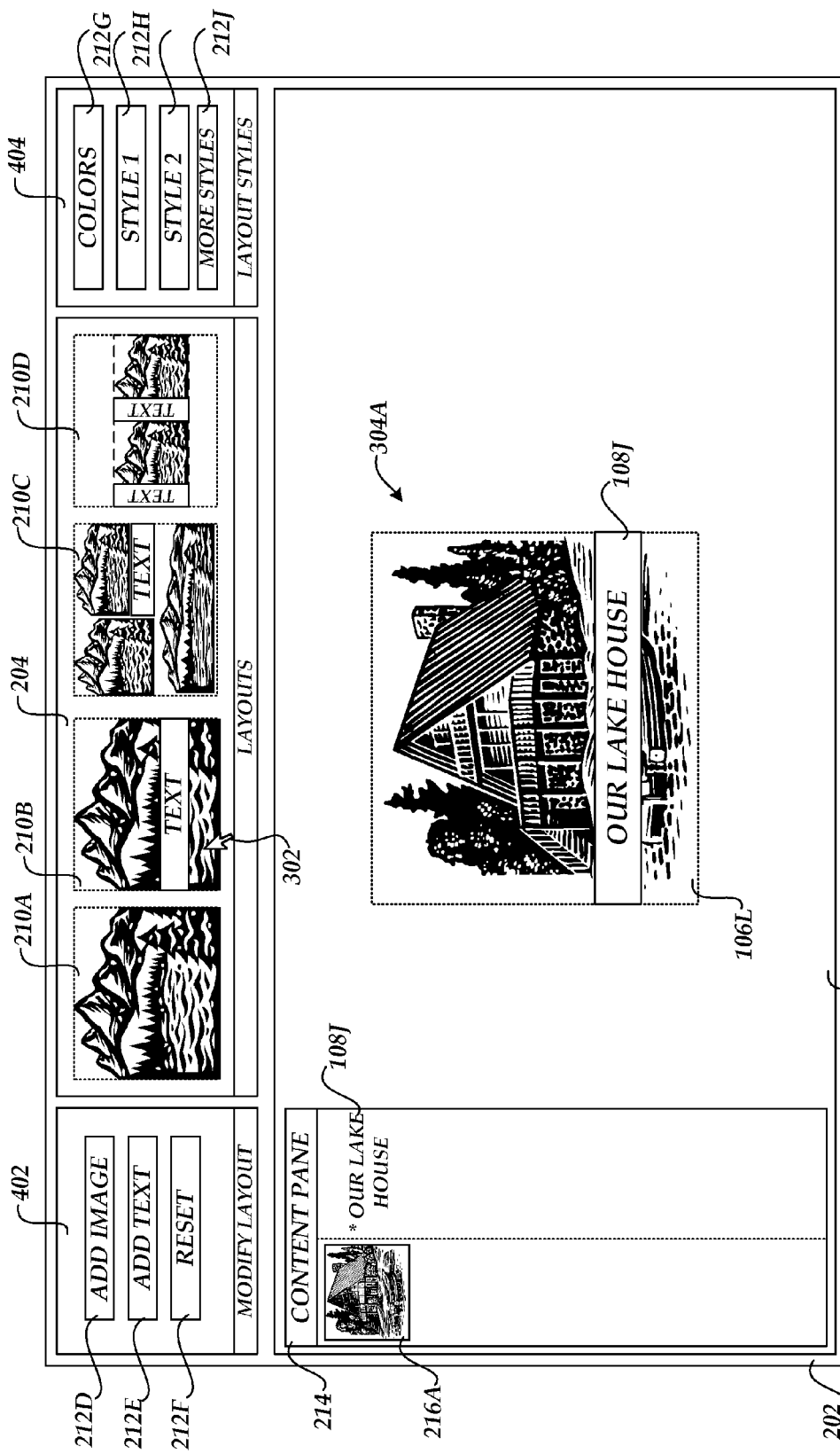

Turning now to FIG. 5, additional details regarding the operation of the user interface 202 will be provided. In particular, FIG. 5 illustrates the process of changing layouts. As described above, selection of one of the visual representations 210A-210D at any time will result in the application of the corresponding layout to the contents of the canvas 206. In the example shown in FIG. 5, a user has selected the visual representation 210B with the mouse cursor 302 and the press of a mouse button. As a result, the corresponding layout has been applied to the contents of the canvas 206 and the layout 304B shown in FIG. 4 has been replaced with the layout 304A shown in FIG. 5. The layout 304A includes the image 106L and the text 108J. It should be appreciated that application of a layout to the contents of the canvas 206 is non-destructive and that, at any time, a new layout may be dynamically applied to the images and text on the canvas 206.

Figure 6:
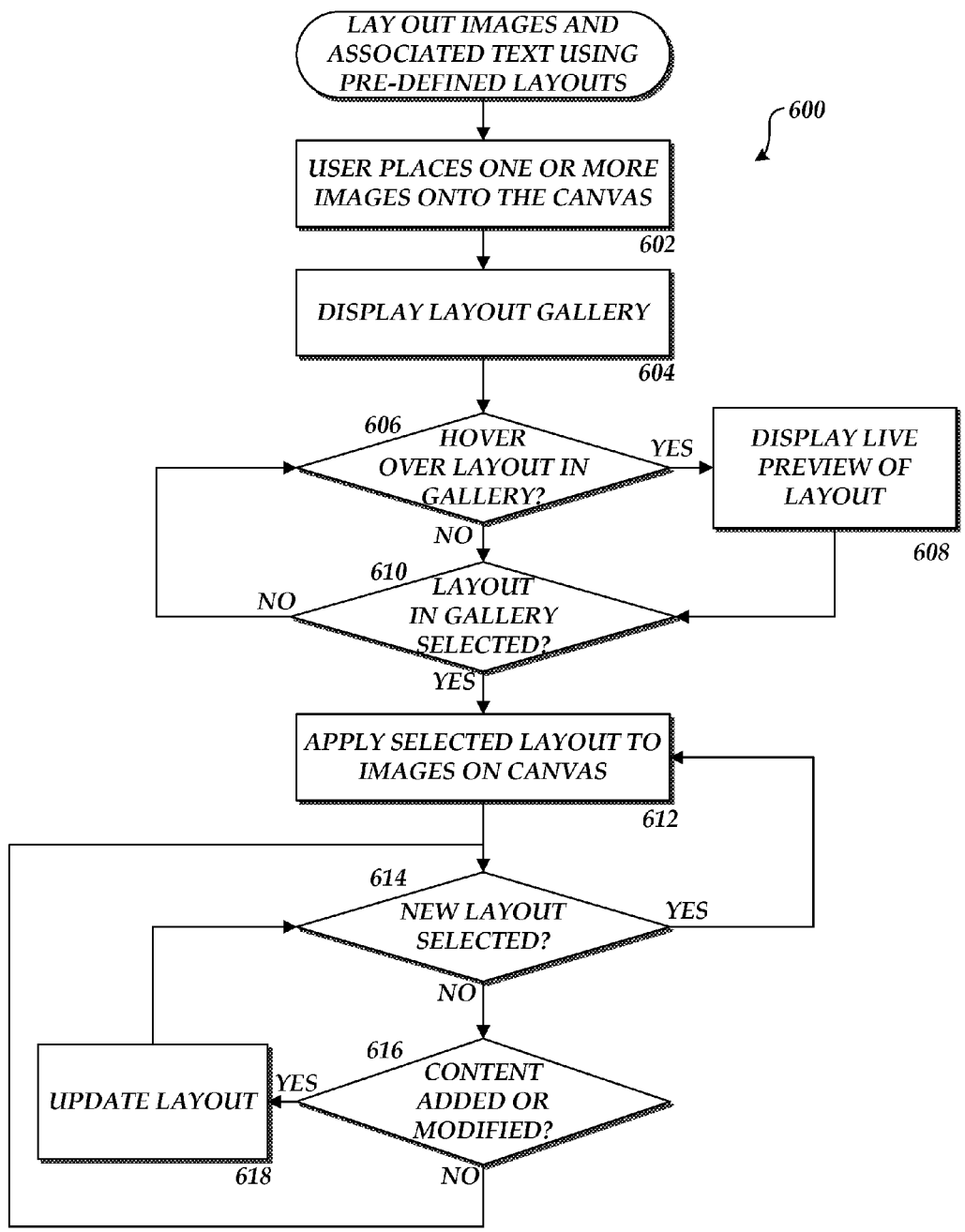
FIG. 6 is a flow diagram showing an illustrative process for dynamically laying out images and associated text using pre-defined layouts in one implementation described herein.

Turning now to FIG. 6, additional details will be provided regarding the embodiments presented herein for dynamically laying out images and associated text. In particular, FIG. 6 is a flow diagram showing a routine 600 that shows aspects of an illustrative process performed by the application program 100 for dynamically laying out images and associated text using pre-defined layouts. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 600 begins at operation 602, where a user places one or more images onto the canvas 206. The routine 600 then continues to operation 604, where the application program 100 displays the layout gallery 204. From operation 604, the routine 600 continues to operation 606, where the application program 100 determines whether the mouse cursor 302 is hovering over one of the visual representations 210A-210D shown in the layout gallery 204. If so, the routine 600 branches from operation 606 to operation 608, where a live preview of the layout corresponding to the visual representation is displayed in the manner described above with respect to FIG. 3. From operation 608, the routine 600 proceeds to operation 610, described below.

If, at operation 606, the application program 100 determines that the mouse cursor 302 is not hovering over one of the visual representations 210A-210D, the routine 600 proceeds to operation 610. At operation 610, the application program 100 determines whether one of the visual representations 210A-210D has been selected, such as by the selection with the mouse cursor 302 and a corresponding mouse button click. If not, the routine 600 returns to operation 606, described above. If one of the visual representations 210A-210D has been selected, thereby indicating that the corresponding layout should be applied to the contents of the canvas 206, the routine 600 proceeds from operation 610 to operation 612.

At operation 612, the application program 100 dynamically applies the appropriate layout to the images and text on the canvas 206 in the manner described above with respect to FIG. 1. The routine 600 then continues to operation 614, where the application program 100 determines whether a new layout has been requested through the selection of one of the visual representations 210A-210D. If so, the routine 600 returns to operation 612, described above, where the application program 100 dynamically applies the appropriate layout to the contents of the canvas 206 in the manner described above with respect to FIG. 1. If a new layout has not been requested, the routine 600 continues from operation 614 to operation 616.

At operation 616, the application program 100 determines whether the current layout has been modified or additional content has been added to the current layout. If not, the routine 600 returns to operation 614, described above. If so, the routine 600 proceeds to operation 618. At operation 618, the application program 100 dynamically regenerates the current layout using the layout definition file 102 to appropriately incorporate the modifications to the layout. The routine 600 then proceeds from operation 618 to operation 614, described above.

Figure 7:
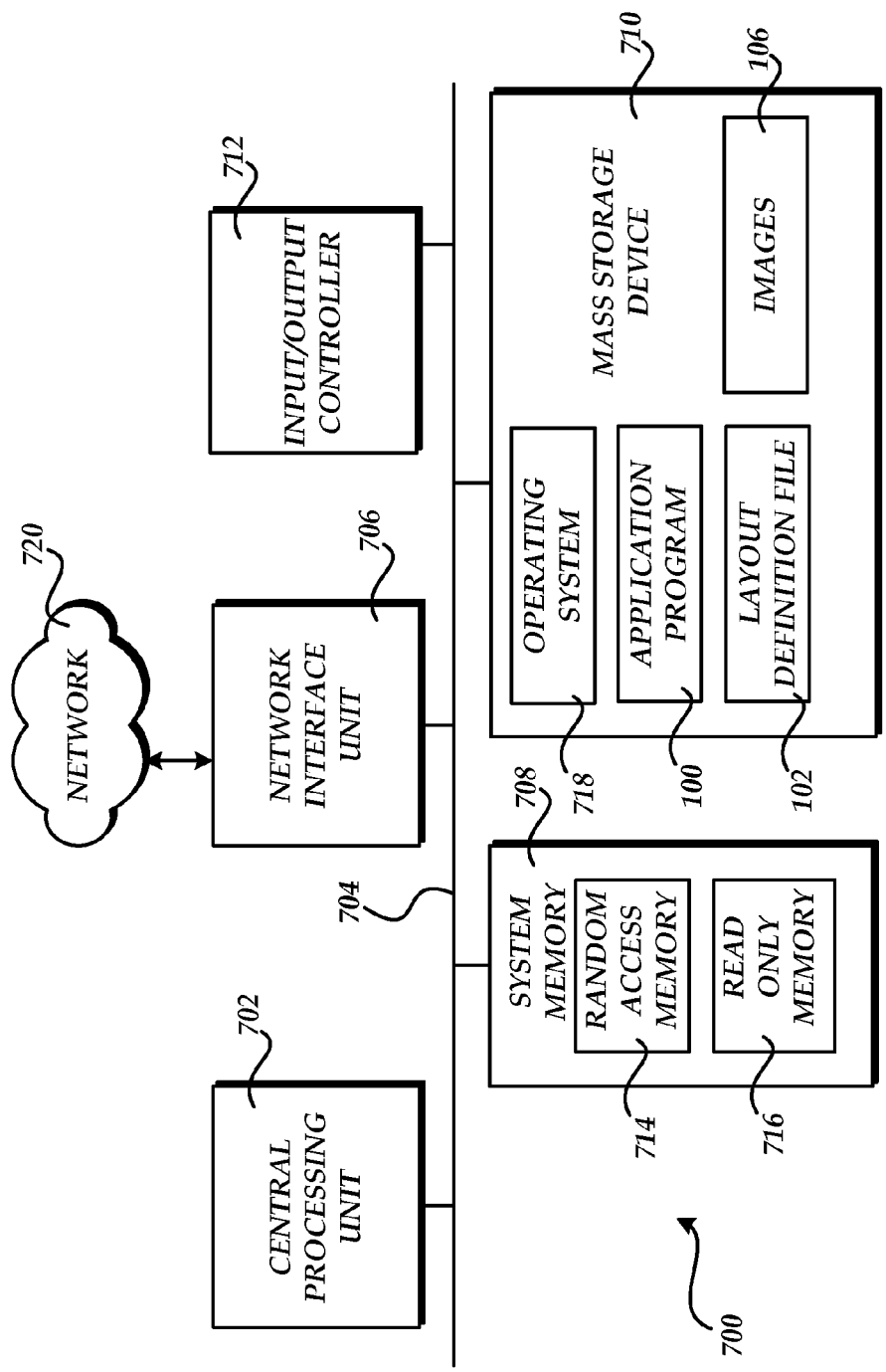
FIG. 7 is a computer architecture diagram showing an illustrative computer hardware and software architecture for a computing system capable of implementing the embodiments presented herein.

FIG. 7 shows an illustrative computer architecture for a computer 700 capable of executing the software components described herein for laying out images and associated text annotations. The computer architecture shown in FIG. 7 illustrates a conventional desktop, laptop computer, or server computer and may be utilized to execute any aspects of the application program 100 described herein.

The computer architecture shown in FIG. 7 includes a central processing unit 702 ("CPU"), a system memory 708, including a random access memory 714 ("RAM") and a read-only memory ("ROM") 716, and a system bus 704 that couples the memory to the CPU 702. A basic input/output system containing the basic routines that help to transfer information between elements within the computer 700, such as during startup, is stored in the ROM 716. The computer 700 further includes a mass storage device 710 for storing an operating system 718, application programs, and other program modules, which will be described in greater detail below.

The mass storage device 710 is connected to the CPU 702 through a mass storage controller (not shown) connected to the bus 704. The mass storage device 710 and its associated computer-readable media provide non-volatile storage for the computer 700. Although the description of computer-readable media contained herein refers to a mass storage device, such as a hard disk or CD-ROM drive, it should be appreciated by those skilled in the art that computer-readable media can be any available computer storage media that can be accessed by the computer 700.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 700.

According to various embodiments, the computer 700 may operate in a networked environment using logical connections to remote computers through a network such as the network 720. The computer 700 may connect to the network 720 through a network interface unit 706 connected to the bus 704. It should be appreciated that the network interface unit 706 may also be utilized to connect to other types of networks and remote computer systems. The computer 700 may also include an input/output controller 712 for receiving and processing input from a number of other devices, including a keyboard, mouse, or electronic stylus (not shown in FIG. 7). Similarly, an input/output controller may provide output to a display screen, a printer, or other type of output device (also not shown in FIG. 7).

As mentioned briefly above, a number of program modules and data files may be stored in the mass storage device 710 and RAM 714 of the computer 700, including an operating system 718 suitable for controlling the operation of a networked desktop, laptop, or server computer. The mass storage device 710 and RAM 714 may also store one or more program modules. In particular, the mass storage device 710 and the RAM 714 may store an application program 100 that provides the functionality described herein for dynamically laying out images and associated text using pre-defined layouts. The mass storage device 710 and RAM 714 may also store the layout definition file 102 and the images 106 utilized by the application program 100.

Based on the foregoing, it should be appreciated that technologies for dynamically laying out images and associated text are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for laying out at least one image and text associated with the at least one image, the method comprising:

displaying a user interface comprising a canvas for presenting the at least one image and the text associated with the at least one image, and a layout gallery for showing at least one selectable visual representation of at least one pre-defined layout of the at least one image and the text on the canvas;

receiving a placement of the at least one image and the text on the canvas;

displaying the at least one image and the text on the canvas according to the placement;

receiving a request to lay out the at least one image and the text on the canvas according to a pre-defined layout, the request comprising a selection of a selectable visual representation that is associated with the pre-defined layout from the layout gallery, and the pre-defined layout comprising design elements that specify how the at least one image and the text are to be displayed on the canvas;

in response to the request, dynamically laying out and displaying the at least one image and the text on the canvas according to the pre-defined layout;

receiving a modification to the pre-defined layout;

in response to receiving the modification, dynamically regenerating the pre-defined layout to form a regenerated layout, the regenerated layout comprising the pre-defined layout modified to incorporate the modification while still retaining the design elements of the pre-defined layout; and displaying the regenerated layout on the canvas.

2. The method of claim 1, wherein the modification comprises adding a content object to the pre-defined layout.

3. The method of claim 2, wherein the user interface further comprises a layout modification palette for providing functionality for modifying the pre-defined layout, the layout modification palette comprising a user interface object to add the content object to the pre-defined layout.

4. The method of claim 3, wherein the layout modification palette further comprises a reset user interface object for resetting the regenerated layout to the pre-defined layout, and further comprising:

receiving a selection of the reset user interface object; and in response to receiving the selection of the reset user interface object, resetting the regenerated layout to the pre-defined layout such that the pre-defined layout is no longer modified with the content object.

5. The method of claim 1, wherein the modification comprises changing a size or a position of one or more of the design elements within the pre-defined layout.

6. The method of claim 5, wherein the user interface further comprises a reset user interface object for resetting the regenerated layout to the pre-defined layout, and further comprising:

receiving a selection of the reset user interface object; and in response to receiving the selection of the reset user interface object, resetting the regenerated layout to the pre-defined layout such that the pre-defined layout is no longer modified with the modification.

7. The method of claim 1, further comprising:

receiving a second request to lay out the at least one image and the text on the canvas according to a second pre-defined layout, the second request comprising a selection of a second selectable visual representation that is associated with the second pre-defined layout from the layout gallery, and the second pre-defined layout comprising other design elements that specify how the at least one image and the text are to be displayed on the canvas; and in response to the second request, dynamically laying out and displaying the at least one image and the text on the canvas according to the second pre-defined layout.

8. The method of claim 1, wherein the user interface further comprises a content pane comprising representations of the at least one image, and displaying the user interface comprises displaying the content pane adjacent to the canvas.

9. A method for dynamically laying out at least one image and text associated with the at least one image according to a pre-defined layout, the method comprising:

displaying a user interface comprising a layout gallery comprising at least one selectable visual representation of at least one pre-defined layout of the at least one image and the text on a canvas that is adjacent to the layout gallery, and a content pane adjacent to the canvas, the content pane comprising a visual representation of a data model set forth on the canvas, the visual representation of the data model on the canvas being configured to show a thumbnail image for each image currently being displayed on the canvas and text, if any, associated with each image currently being displayed on the canvas;

receiving a selection of a selectable visual representation from the at least one selectable visual representation displayed in the layout gallery;

in response to receiving the selection, dynamically laying out the at least one image and the text according to a pre-defined layout associated with the selection; and displaying the at least one image and the text according to the pre-defined layout on the canvas.

10. The method of claim 9, further comprising:

receiving a selection of a second selectable visual representation from the at least one selectable visual representation displayed in the layout gallery;

in response to receiving the selection of the second selectable visual representation, dynamically laying out the at least one image and the text according to a second pre-defined layout associated with the second selectable visual representation; and displaying the at least one image and the text according to the second pre-defined layout.

11. The method of claim 9, further comprising detecting a modification to the pre-defined layout or an addition of new content to the pre-defined layout, and dynamically regenerating the pre-defined layout in response thereto to form a regenerated layout.

12. The method of claim 11, wherein the user interface further comprises a reset user interface object for resetting the regenerated layout to the pre-defined layout, and further comprising:

receiving a selection of the reset user interface object; and in response to receiving the selection of the reset user interface object, resetting the regenerated layout to the pre-defined layout.

13. The method of claim 9, further comprising:

receiving a selection of a thumbnail image of one of the at least one image displayed on the canvas; and in response to receiving the selection of the thumbnail image, causing the one of the at least one image displayed on the canvas to be selected.

14. The method of claim 9, further comprising:

receiving an edit to the data model via the content pane, the edit comprising an addition of a node to the data model, a removal of a node from the data model, or a change to an order of a plurality of nodes contained within the data model.

15. A computing system comprising:
a processor; and
a computer-readable storage medium storing computer-executable instructions which, when executed by the processor, cause the processor to
  display a user interface comprising a canvas, a layout gallery adjacent to the canvas, and a content pane adjacent to the canvas, wherein
    the canvas is configured to present at least one image and text associated with the at least one image according to at least one pre-defined layout,
    the layout gallery comprises at least one selectable visual representation of the at least one pre-defined layout which, when selected, causes the at least one image and the text on the canvas to be dynamically laid out according to a corresponding selected pre-defined layout, and
    the content pane comprises at least one selectable representation of the at least one image which, when selected, causes a corresponding selected image to be selected on the canvas,
  receive a placement of the at least one image and the text on the canvas,
  display the at least one image and the text on the canvas according to the placement,
  receive a selection of a selectable visual representation of the at least one selectable visual representation displayed in the layout gallery,
  in response to receiving the selection of the selectable visual representation, lay out and display the at least one image and the text based on a pre-defined layout corresponding to the selectable visual representation, the pre-defined layout comprising design elements that specify how the at least one image and the text are to be displayed on the canvas,
  receive a modification to the pre-defined layout, the modification comprising adding a content object to the pre-defined layout or changing a size or a position of one or more of the design elements within the pre-defined layout,
  in response to receiving the modification for the layout, dynamically regenerate the pre-defined layout to form a regenerated layout, the regenerated layout comprising the pre-defined layout modified to incorporate the modification while still retaining the design elements of the pre-defined layout, and
  display the regenerated layout on the canvas.

* * * * *